United States Patent [19]

Hayashi

[11] Patent Number: 5,121,255
[45] Date of Patent: Jun. 9, 1992

[54] OBJECTIVE LENS SYSTEM FOR MICROSCOPE

[75] Inventor: Takahisa Hayashi, Kyoto, Japan
[73] Assignee: Dainippon Screen Mfg. Co., Japan
[21] Appl. No.: 367,726
[22] Filed: Jun. 19, 1989

[30] Foreign Application Priority Data

Jun. 21, 1988 [JP] Japan .................. 63-153033
Jun. 21, 1988 [JP] Japan .................. 63-153034

[51] Int. Cl.⁵ ............................ G02B 21/02
[52] U.S. Cl. .................. 359/656; 359/355;
                              359/660; 359/661
[58] Field of Search ........ 350/414, 527, 475, 1.1,
              350/1.2, 1.3, 1.4; 359/355, 656, 660, 661

[56] References Cited

U.S. PATENT DOCUMENTS

3,115,538 12/1963 Ruben et al. .................. 350/414
3,486,805 12/1969 Kobayashi .................... 350/1.4
4,416,519 11/1983 Kobayashi .................... 350/414

Primary Examiner—Paul M. Dzierzynski
Attorney, Agent, or Firm—Ostrolenk, Faber, Gerb & Soffen

[57] ABSTRACT

An objective lens system for a microscope. The objective lens system includes a first lens group which includes a lens in the form of meniscus made of quartz or fluorite having a positive power; and a second lens group including a biconcave lens made of quartz and a biconvex lens made of fluorite. The first lens group and the biconcave and biconvex lenses are successively spaced apart from the object side of the system. The system transmits ultraviolet and/or far ultraviolet rays and can correct chromatic aberration. The system is uncomplicated.

20 Claims, 9 Drawing Sheets

FIG. 14 ional objective lenses for use within microscopes are employable in visible and infrared regions but cannot be used in ultraviolet and far ultraviolet regions. This is because most optical glass materials do not transmit shorter-wavelength rays, i.e., rays whose wavelengths are shorter than 300 nm, i.e., ultraviolet and far ultraviolet rays.

OBJECTIVE LENS SYSTEM FOR MICROSCOPE

BACKGROUND OF THE INVENTION

1. Field of the Invention:

The present invention relates to an objective lens system which is employable in an ultraviolet region, particularly in a far ultraviolet region with wavelengths of less than 300 nm. The system can be used within a microscope.

2. Description of the Prior Art:

Most conventional objective lenses for use within microscopes are employable in visible and infrared regions but cannot be used in ultraviolet and far ultraviolet regions. This is because most optical glass materials do not transmit shorter-wavelength rays, i.e., rays whose wavelengths are shorter than 300 nm, i.e., ultraviolet and far ultraviolet rays.

Assuming the numerical aperture (NA) of an objective lens of a microscope remains constant, its resolution limit is increased as the wavelength is shortened. Therefore, it is possible to observe a sample in greater detail by shortening the wavelength of illuminating and observed rays. Further, a greater variety of samples fluoresce when exposed to ultraviolet rays (compared to those which fluoresce when exposed to visible rays). Therefore, to obtain more information by observing a sample through a microscope, it is advantageous to use light in the ultraviolet region. To this end, an objective lens which is employable in the ultraviolet and far ultraviolet regions is required. The following prior art objective lenses have generally been employed.

FIRST PRIOR ART EXAMPLE

Figure 1:
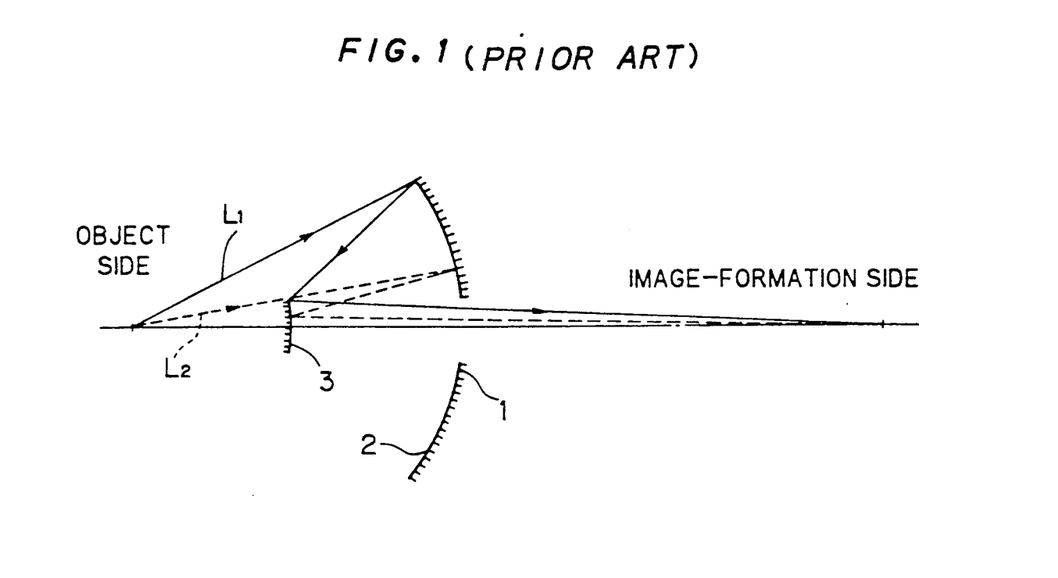
FIG. 1 is a block diagram showing an objective lens for a microscope according to a first prior art example.

FIG. 1 is a block diagram of an objective lens for use within a microscope according to a first prior art example. This lens is described in "Lens Design Fundamentals" by Rudolf Kingslake, Academic Press, 1978, p. 333.

The objective lens is a reflection type lens. The lens includes a first reflecting mirror 2 having an aperture 1 and a second reflecting mirror 3 for reflecting light reflected by the first reflecting mirror 2 and for guiding the same to an image-formation side (right-hand side of the figure) through the aperture 1.

Light $L_1$ applied to the objective lens from an object side (left-hand side of the figure) is reflected by the first reflecting mirror 2 and guided to the second reflecting mirror 3. The reflected light is further reflected by the second reflecting mirror 3 and guided to the image-formation side, to be imaged at a prescribed position.

The objective lens is formed by only the first and second reflecting mirrors 2 and 3. The objective lens performs excellently with no chromatic aberration and is employable in the ultraviolet region.

However, the objective lens of the first prior art example cannot be telecentric with respect to the object side. Therefore, the quantity of light may be reduced around the visual field and magnification is varied by irregularities on the surface of the sample. Further, since the second reflecting mirror 3 is on an optical axis X, light $L_2$ from the object side is cut off by the second reflecting mirror 3. Thus, the central light $L_2$ cannot contribute to image formation and the quantity of light at the imaging position is reduced. Further, resolving power is reduced by diffraction. When a plurality of the lenses are arranged in a turret to switch the magnification of a microscope by switching the objective lenses, the pupil diameters and focal distances of the lenses are not uniform. Consequently, the degree of freedom in designing the objective lens is reduced as compared with the case of forming an objective lens for a microscope by a glass system.

SECOND AND THIRD PRIOR ART EXAMPLES

Fluorite, quartz, lithium fluoride (LiF), barium fluoride ($BaF_2$), sodium chloride (NaCl) and the like are known as optical materials for transmitting rays of ultraviolet and far ultraviolet light. Objective lenses for transmitting ultraviolet and far ultraviolet rays are made of these materials.

Figure 2:
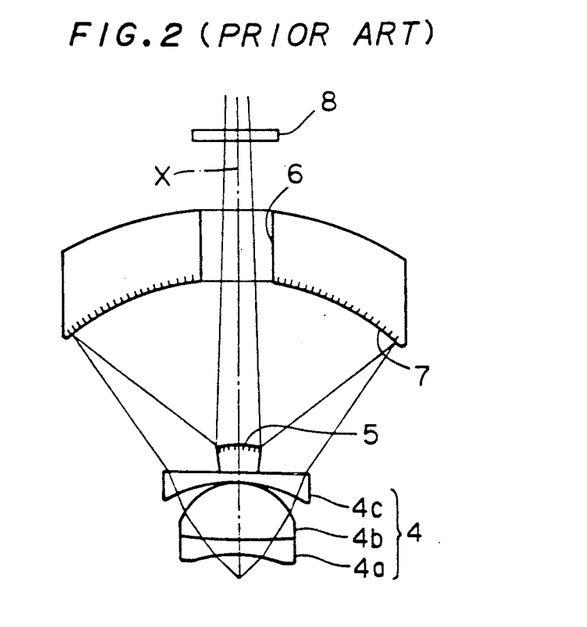
FIG. 2 is a block diagram showing an objective lens for a microscope according to a second prior art example.

FIG. 2 is a block diagram of an objective lens according to a second prior art example. This objective lens is useful within a microscope. The lens is described in "Applied Optics and Optical Engineering III" supervised by Kingslake, Academic Press, 1965, p. 173.

The objective lens illustrated in FIG. 2 is formed by a refracting lens system 4, a first reflecting mirror 5, a second reflecting mirror 7 having an aperture 6 and a fourth lens 8 made of quartz. These elements 4, 5, 7 and 8 are serially arranged on an axis X. The refracting lens system 4 is formed by a first lens 4a which is made of quartz and which has a negative power, a second lens 4b which is made of fluorite and which has a positive power and a third lens 4c which is made of fluorite and which has a negative power. The lens 4b is joined to the lens 4a. The lens 4c is adjacent to the second lens 4b.

Light from an object side (lower side of the figure) is guided to the second reflecting mirror 7 through the refracting lens system 4. Light reflected by the second reflecting mirror 7 is further reflected by the first reflecting mirror 5 and guided to an image formation side (upper side of the figure) through the aperture 6 and the fourth lens 8, to be imaged at a prescribed position.

The first and second lenses 4a and 4b must be joined to each other. Since there is presently no adhesive which can transmit ultraviolet and far ultraviolet rays, the junction surfaces must be brought into optical contact with each other. Otherwise reflection would occur at the junction surface. To achieve such optical contact, the junction surfaces of the lenses 4a and 4b must be accurately finished. This increases the cost of the objective lens. Further, since a central portion of light is cut off by the first reflecting mirror 5 (as in the first prior art example), both resolving power and light quantity are reduced.

Figure 3:
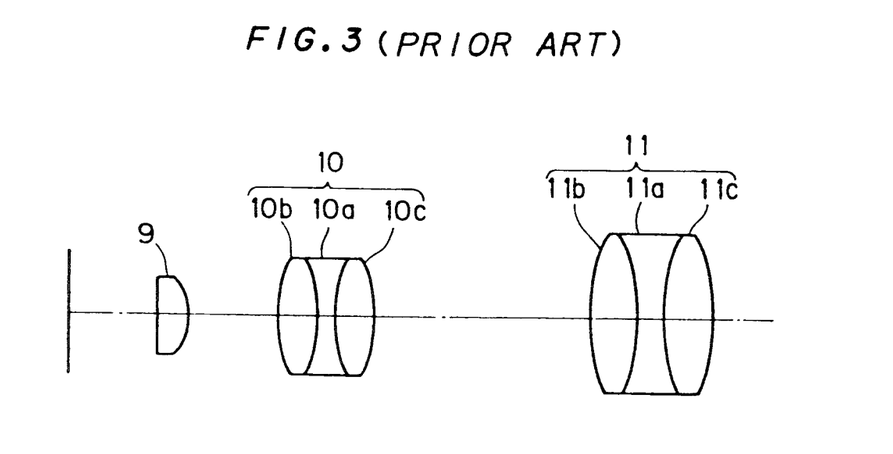
FIG. 3 is a block diagram showing an objective lens for a microscope according to a third prior art example.

FIG. 3 is a block diagram of an objective lens according to a third prior art example. This objective lens is useful within a microscope. The lens is described in Hikari Gijutsu Contact Vol. 25, No. 2, February 1987, p. 137.

As shown in FIG. 3, the objective lens is formed by a first lens 9 made of fluorite and second and third lens groups 10 and 11, which are serially arranged between an object side and an image formation side. The second lens group 10 is formed by holding a concave lens 10a (made of quartz) between convex lenses 10b and 10c (made of fluorite) and joining the same to each other. The third lens group 11 is formed by holding a concave lens 11a (made of quartz) between convex lenses 11b and 11c (made of fluorite) and joining the same to each other. Thus, the second lens group 10 is similar to the third lens group 11.

Thus, light from the object side (left-hand side of the figure) is transmitted through the first lens 9 and the second and third lens groups 10 and 11 and is imaged at a prescribed position.

Chromatic aberration can be corrected with the system illustrated in FIG. 3. However, the convex lens 10b, the concave lens 10a and the convex lens 10c must be brought into optical contact with each other, as in the second prior art example. The convex lens 11b, the concave lens 11a and the convex lens 11c must also be brought into optical contact with each other. Thus, the junction surfaces must be accurately finished, increasing the cost of the objective lens.

SUMMARY OF THE INVENTION

The present invention relates to an objective lens system, including: a first lens group including a meniscus lens, the meniscus lens having a concave surface which is directed toward an object, the meniscus lens being capable of transmitting ultraviolet and/or far ultraviolet light from the object, the meniscus lens having a positive power; and a second lens group including a biconcave lens and a biconvex lens, the biconcave lens and the biconvex lens being capable of transmitting the ultraviolet and/or far ultraviolet light, the second lens group being spaced apart from the first lens group, the biconcave lens being located between the meniscus lens and the biconvex lens, the biconvex lens being spaced apart from the biconcave lens.

The present invention also relates to an objective lens system, including: a first lens group including a first lens and a second lens, the first lens having a negative power, the second lens being a biconvex lens, the first lens being located between an object and the second lens, the first and second lenses being capable of transmitting ultraviolet and/or far ultraviolet light from the object; and a second lens group including a third biconcave lens and a fourth biconvex lens, the third lens being spaced apart from the second lens, the third lens being located between the second lens and the fourth lens, the fourth lens being spaced apart from the third lens, the third and fourth lenses being capable of transmitting the ultraviolet and/or far ultraviolet light.

The present invention also relates to an objective lens system, including: a first lens group which is capable of transmitting ultraviolet and/or far ultraviolet light from an object; and a second lens group which is spaced apart from the first lens group, the second lens group including a first lens and a second lens, the first lens being located between the first lens group and the second lens, the second lens being spaced apart from the first lens, the first and second lenses being capable of transmitting the ultraviolet and/or far ultraviolet light; and wherein the following inequalities are satisfied:

$$\phi_1 > 0$$

$$\phi_2 > 0$$

$$0.35\phi < \phi_2 < 0.9\phi$$

$$1.05L\phi < (\phi_1 + \phi_2)/\phi < 1.15L\phi$$

$$0.8 < |\phi_{2+}/\phi_{2-}| < 1.2$$

where
$\phi_1$: power of first lens group
$\phi_2$ = power of the second lens group
$\phi$ = power of the objective lens system L = distance between the object and the focal point of the objective lens system in an image formation direction
$\phi_{2+}$ = power of the second lens
$\phi_{2-}$ = power of the first lens.

The present invention also relates to an apparatus for measuring the thickness of a film on a sample, the apparatus including: means for illuminating a sample; and a microscopic optical system for imaging ultraviolet and/or far ultraviolet light from the sample, the microscopic optical system including an objective lens system for converging the light in an image formation direction.

An object of the present invention is to provide an inexpensive objective lens system for a microscope which can transmit ultraviolet and/or far ultraviolet rays and which can correct chromatic aberration.

Another object of the present invention is to provide an objective lens system for a microscope which achieves the above object and which can further correct spherical aberration.

Another object of the present invention is to provide an apparatus which uses ultraviolet and/or far ultraviolet light to accurately measure the thickness of a film which is formed on a sample.

DESCRIPTION OF THE PREFERRED EMBODIMENTS

A. First Embodiment:

An objective lens system for a microscope according to a first embodiment of the present invention includes a first lens group formed by a meniscus lens made of quartz or fluorite which has a positive power and a second lens group formed by a biconcave lens made of quartz and a biconvex lens made of fluorite. The first lens group, biconcave lens and biconvex lens are serially arranged between an object side and an image formation side. A concave side of the first lens group faces the object side. The biconcave lens is separated from an image formation side of the first lens group by an air space. The biconvex lens is separated from an image formation side of the biconcave lens by an air space.

The aforementioned objective lens satisfies the following conditions:

$$\phi_1 > 0$$

$$\phi_2 > 0$$

$$0.35\phi < \phi_2 < 0.92\phi$$

$$1.05L\phi < (\phi_1 + \phi_2)/\phi < 1.15L\phi$$

$$0.9 < |\phi_{2+}/\phi_{2-}| < 1.2$$

where $\phi_1$: power of first lens group
$\phi_2$: power of second lens group
$\phi$: power of objective lens system
L : distance between object plane and image side focal point of lens system
$\phi_{2+}$: power of biconvex lens forming second lens group
$\phi_{2-}$: power of biconcave lens forming second lens group The power $\phi_2$ of the second lens group is less than 92% and in excess of 35% of the power $\phi$ of the objective lens system. This is because the working distance of the system is reduced if the power $\phi_2$ exceeds 92% of the power $\phi$ and because the full length of the objective lens system becomes excessive (compared to the focal length) if the power $\phi_2$ is less than 35% of the power $\phi$.

A value $(\phi_1 + \phi_2)/\phi$ is less than 115% and in excess of 105% of a value obtained by multiplying the power $\phi$ of the objective lens system by the distance L between the object plane and the image side focal point of the objective lens system. This is because the curvature of an image surface is increased excessively due to an increase in Petzval's sum and because the length of the objective lens system becomes excessive (compared to the focal length) if the value $(\phi_1 + \phi_2)/\phi$ exceeds 115% of the value L·$\phi$. Yet it is difficult to attain telecentricity if the value $(\phi_1 + \phi_2)/\phi$ is less than 105% of the value L·$\phi$.

An absolute value $|\phi_{2+}/\phi_{2-}|$ is less than 1.2 and in excess of 0.9. This is because correction of chromatic aberration is difficult if the absolute value $|\phi_{2+}/\phi_{2-}|$ is outside this region and correction of spherical aberration is insufficient if the absolute value $|\phi_{2+}/\phi_{2-}|$ exceeds 1.2. Yet correction is excessive and the curvature of the image surface is increased if the absolute value $|\phi_{2+}/\phi_{2-}|$ is less than 0.9.

According to a first embodiment of the present invention, the first and second lens groups are made of quartz or fluorite. There is no adhesive between the first and second lens groups or between the biconcave lens in the second lens group. As a result, the objective lens can transmit not only visible and infrared rays but also ultraviolet and/or far ultraviolet rays. Further, since the second lens group includes the biconcave lens made of quartz having negative power and the biconvex lens made of fluorite having positive power, spherical aberration and chromatic aberration can be corrected.

A-1. First Example

Figure 4:
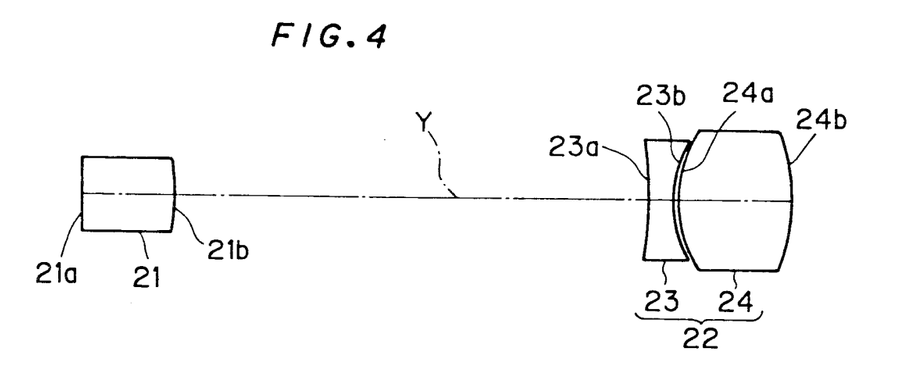
FIG. 4 is an arrangement view showing a first example of an objective lens system according to the first embodiment of the present invention.

As shown in FIG. 4, an objective lens system for a microscope includes a first lens group 21 and a second lens group 22. The first lens group 21 includes a meniscus lens made of fluorite. The mensicus lens has a positive power. The second lens group 22 is formed by a biconcave lens 23 made of quartz and a biconvex lens 24 made of fluorite. A concave surface 21a of the first lens group 21 faces an object side (left-hand side of the figure). The first and second lens groups 21 and 22 are spaced apart from each other. The biconcave and biconvex lenses 23 and 24 are also spaced apart from each other.

The numerical aperture, image size (diameter) and imaging magnification of the objective lens system shown in FIG. 4 are 0.083, 10.6 mm and −10, respectively.

In the first lens group 21, a radius of curvature $R_1$ of the concave surface 21a and a radius of curvature $R_2$ of a surface 21b directed toward the image formation side (right-hand side of the figure) are as follows:

$$R_1 = -45.00 \quad R_2 = -11.500$$

In the biconcave lens 23 made of quartz, a radius of curvature $R_3$ of a surface 23a directed toward the object side and a radius of curvature $R_4$ of a surface 23b directed toward the image formation side are as follows:
$$R_3 = -17.850 \quad R_4 = -5.00$$

In the biconcave lens 24 made of fluorite, a radius of curvature $R_5$ of a surface 24a directed toward the object side and a radius of curvature $R_6$ of a surface 24b directed to the image formation side are as follows:

$$R_5 = 5.360 \quad R_6 = -8.350$$

Central thickness values $D_1$, $D_2$ and $D_3$ of the lenses 21, 23 and 24, respectively, are as follows:

$$D_1 = 4.00 \quad D_2 = 1.00 \quad D_3 = 5.00$$

Further, the spacing $D_{12}$ between the first lens group 21 and the biconcave lens 23 on an optical axis Y and the spacing $D_{23}$ between the biconcave lens 23 and the biconvex lens 24 on the optical axis Y are as follows:

$$D_{12} = 20.60 \quad D_{23} = 0.20$$

All of the radii of curvature $R_1$ to $R_6$, the thickness values $D_1$ to $D_3$ and the spacing values $D_{12}$ and $D_{23}$ are dimensionless. This also applies to the following description.

In the objective lens system shown in FIG. 4, the power $\phi_1$ of the first lens group 21, the power $\phi_2$ of the second lens group 22, the power $\phi_{2-}$ of the biconcave lens 23, the power $\phi_{2+}$ of the biconcave lens 24, the power $\phi$ of the system and the distance L between the object plane and the image side focus of the objective lens system are as follows:

$\phi_1 = 0.030513 \quad \phi_2 = 0.025630$ $\phi_{2+} = -0.126829 \quad \phi_{2-} = 0.123336$ $\phi = 0.033333 \quad L = 45$ Thus, $0.35\phi = 0.011667$ $0.92\phi = 0.030667$ and the objective lens system satisfies the conditions:

$0.35\phi < \phi_2 < 0.92\phi$

Figure 5:
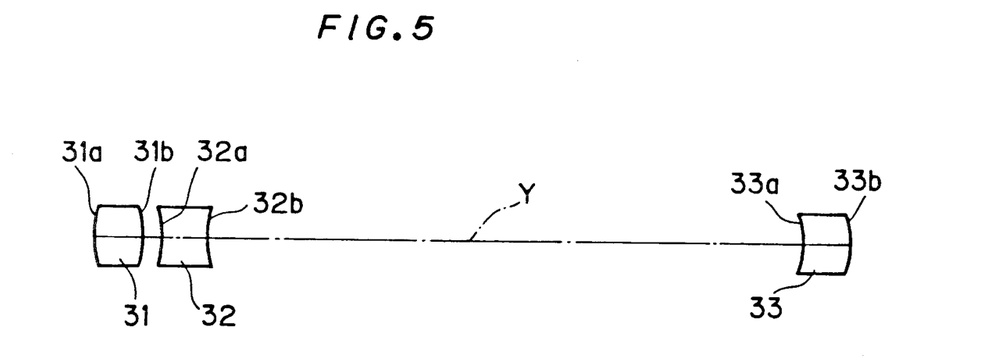
FIG. 5 is a block diagram showing the image formation lens system.

Further:

$(\phi_1 + \phi_2)/\phi = 1.684290$ $1.05L\phi = 1.575000$ $1.15L\phi = 1.725000$ $1.05L\phi < (\phi_1 + \phi_2)\phi < 1.15L\phi$ Further, $|\phi_{2+}/\phi_{2-}| = 0.972456$ $0.9 < |\phi_{2+}/\phi_{2-}| < 1.2$ Considering the case of applying the objective lens system shown in FIG. 4 to a reflection type microscope, this objective lens system is formed in the so-called infinite correction system. Thus, observed light from a sample is not imaged independently through the objective lens system, but the objective lens system is combined with an image formation lens system as shown in FIG. 5, for example. Objective lens systems according to Examples 2 to 4 described hereinafter are also combined with the image formation lens system shown in FIG. 5.

FIG. 5 is a block diagram showing the image formation lens system. As shown in FIG. 5, the image formation lens system is formed by a first lens 31 made of fluorite, a second lens 32 made of quartz and a third lens 33 made of quartz, successively disposed in this order from an object side (left-hand side of the figure) of the image formation lens system.

The first lens 31 has a convex surface 31a directed toward the object side. The surface 31a has a radius of curvature $r_1$. The first lens 31 also has a surface 31b directed toward the image formation side (right-hand side of the figure). The surface 31b has a radius of curvature $r_2$. The radii of curvature $r_1$ and $r_2$ are as follows:

$r_1 = 23.000 \quad r_2 = -31.540$

The second lens 32 has a surface 32a which is directed toward the object side and a surface 32b which is directed toward the image formation side. The surfaces 32a and 32b have radii of curvature $r_3$ and $r_4$, respectively, as follows:

$r_3 = -23.180 \quad r_4 = 33.710$

The third lens 33 has a surface 33a which is directed toward the object side and a surface 33b which is directed toward the image formation side. The surfaces 33a and 33b have radii of curvature $r_5$ and $r_6$, respectively, as follows:

$r_5 = -10.530 \quad r_6 = -13.488$

Central thickness values $d_1$, $d_2$ and $d_3$ of the first to third lenses 31 to 33, respectively, are as follows:

$d_1 = d_2 = d_3 = 7.00$

Further, the spacing $d_{12}$ between the first and second lenses 31 and 32 on an optical axis Y and the spacing $d_{23}$ between the second and third lenses 32 and 33 on the optical axis Y are as follows:

$d_{12} = 2.75 \quad d_{23} = 86.40$

The radii $r_1$ to $r_6$, the thickness values $d_1$ to $d_3$ and the spacing values $d_{12}$ and $d_{23}$ are dimensionless.

FIGS. 6A, 6B, 6C and 6D illustrate spherical aberration, sine condition, astigmatism and distortion aberration of the objective lens system. The results shown in FIGS. 6A to 6D are obtained through computer simulation based on the aforementioned data.

Figure 6A:
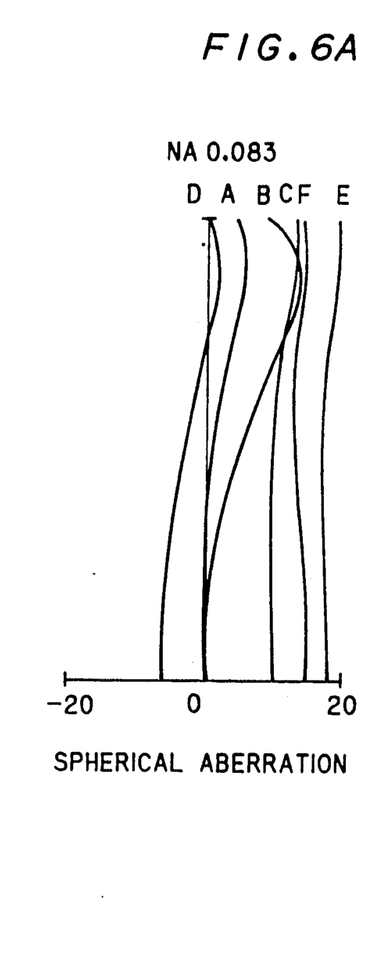
FIGS. 6A, 6B, 6C and 6D illustrate spherical aberration, sine condition, astigmatism and distortion aberration of the objective lens system for a microscope shown in FIG. 4, respectively.
Figure 6B:
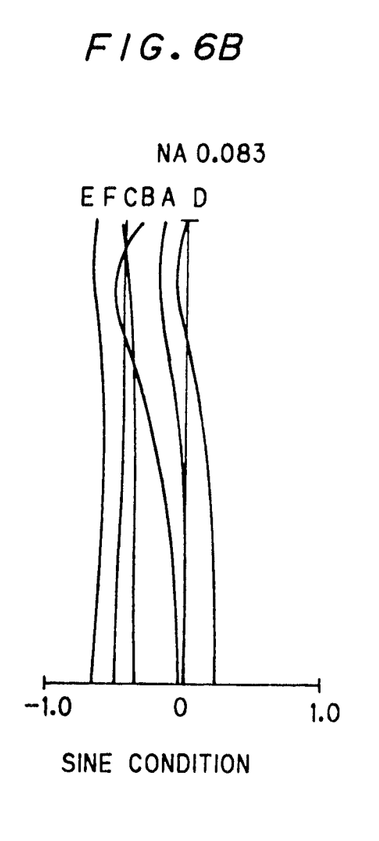
Figure 6C:
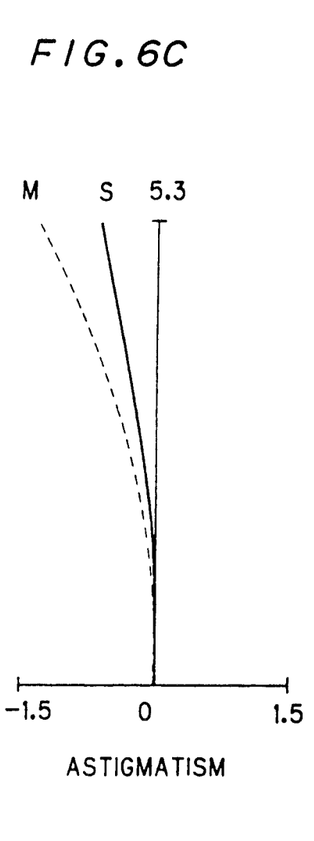
Figure 6D:
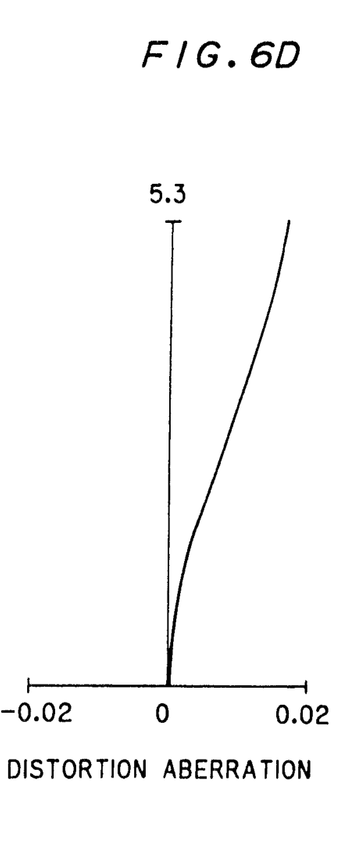

Referring to FIG. 6A, the horizontal axis represents aberration values and the vertical axis represents aperture numbers. Referring to FIG. 6B, the horizontal axis represents sine values and the vertical axis represents numerical apertures. Referring to FIGS. 6A and 6D, symbols A to F represent simulation results with respect to rays having wavelengths of 298.06 (nm), 202.54 (nm), 398.84 (nm), 253.70 (nm), 587.56 (nm) and 800.00 (nm), respectively. Referring to FIG. 6C, the horizontal axis represents aberration values and the vertical axis represents image height values. The dotted line in FIG. 6C shows astigmatism of a meridional image surface with respect to a ray (symbol A) having a wavelength of 298.06 nm. The solid line in FIG. 6C shows astigmatism of a sagital image surface with respect to the same ray. Referring to FIG. 6D, the horizontal axis represents aberration values and the vertical axis represents image height values. The solid line in FIG. 6D shows distortion aberration with respect to the ray (symbol A) having a wavelength of 298.06 nm.

In the following Examples 2 to 4, wavelength, etc. are shown only through the aforementioned symbols, and description thereof is omitted.

A-2. Second Example

Figure 7:
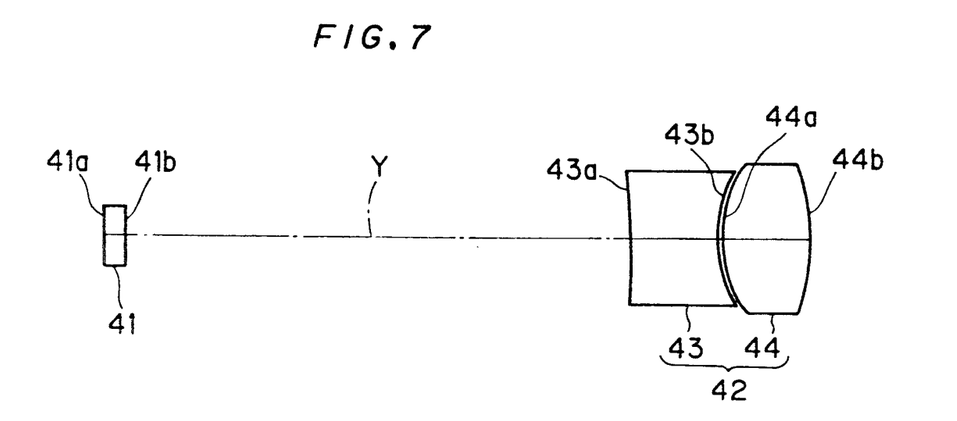
FIGS. 7 is an arrangement view showing a second example of an objective lens system according to the first embodiment of the present invention.
Figure 8A:
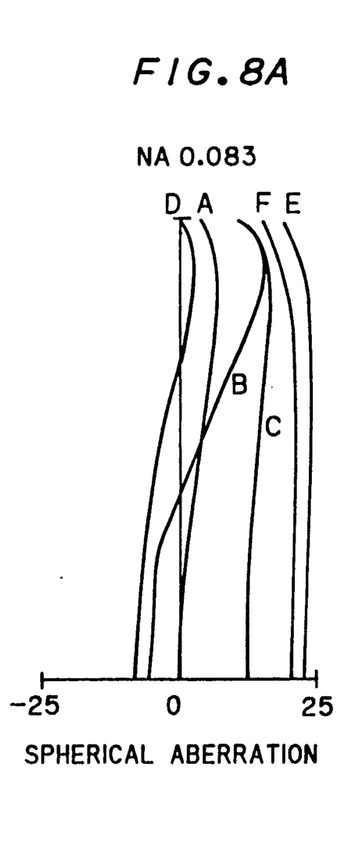
FIGS. 8A, 8B, 8C and 8D illustrate spherical aberration, sine condition, astigmatism and distortion aberration of the objective lens system for a microscope shown in FIG. 7, respectively.
Figure 8B:
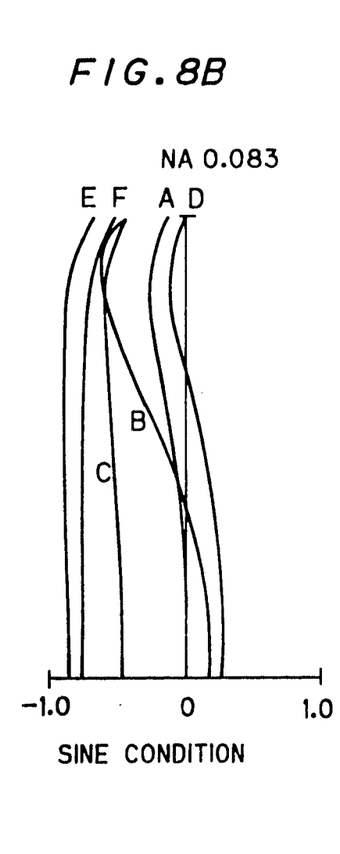
Figure 8C:
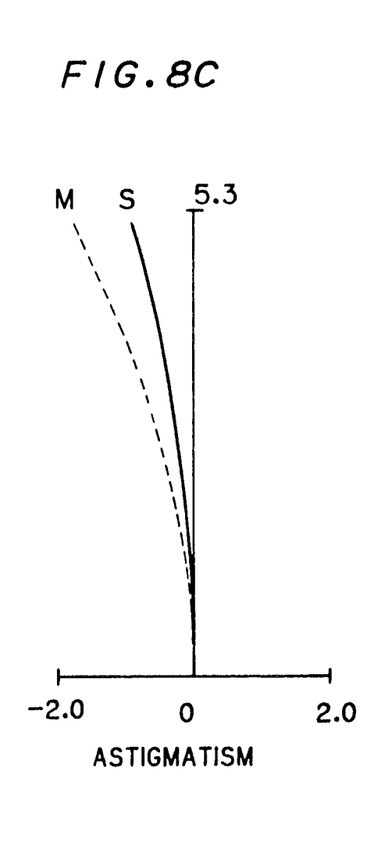
Figure 8D:
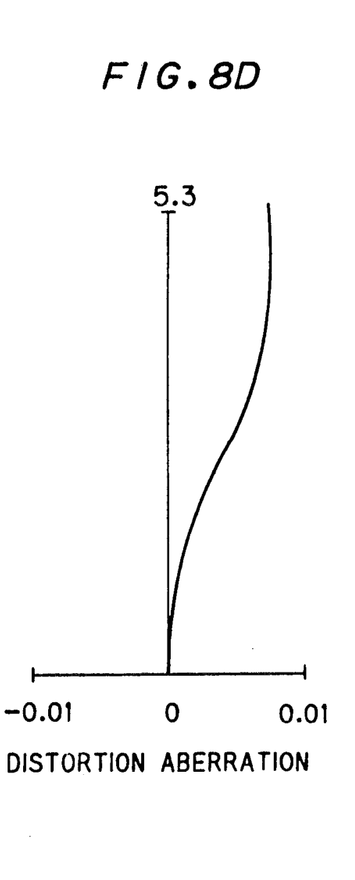

FIG. 7 illustrates a second example of an objective lens system according to the first embodiment of the present invention. The objective lens system according to the second example is different from the first example in that a meniscus lens forming a first lens group 41 is made of quartz instead of fluorite, but is otherwise identical in structure to the first lens group of the first example. Therefore, redundant description is omitted.

The numerical aperture, image size (diameter) and imaging magnification of the second example are equal to that of the first example, respectively.

The radius of curvature $R_1$ of the concave surface 41a and the radius of curvature $R_2$ of the surface 41b directed toward the image formation side (right-hand side of the figure) are as follows:

$R_1 = -44.300 \quad R_2 = -13.830$

Referring to a biconcave lens 43, a radius of curvature $R_3$ of a surface 43a directed toward the object side and a radius of curvature $R_4$ of a surface 43b directed toward the image formation side are as follows:

$$R_3 = -44.710 \quad R_4 = 5.400$$

Referring to a biconvex lens 44, a radius of curvature $R_5$ of a surface 44a directed toward the object side and a radius of curvature $R_6$ of a surface 44b directed toward the image formation side are as follows:

$$R_5 = 5.613 \quad R_6 = 10.060$$

Central thickness values $D_1$, $D_2$ and $D_3$ of the lenses 41, 43 and 44, respectively, are as follows:

$$D_1 = 1.00 \quad D_2 = 3.75 \quad D_3 = 3.80$$

Further, the spacing $D_{12}$ between the first lens group 41 and the biconcave lens 43 on an optical axis Y and the spacing $D_{23}$ between the biconcave lens 43 and the biconvex lens 44 on the optical axis Y are as follows:

$$D_{12} = 21.40 \quad D_{23} = 0.16$$

In the objective lens system shown in FIG. 7, the power $\phi_1$ of the first lens group 41, the power $\phi_2$ of the second lens group 42, the power $\phi_{2-}$ of the biconcave lens 43, the power $\phi_{2-}$ of the biconvex lens 44, the power $\phi$ of the objective lens system and the distance L between the object plane and the image side focal point of the objective lens system are as follows:

$$\phi_1 = 0.024550 \quad \phi_2 = 0.030121$$

$$\phi_{2-} = -0.103851 \quad \phi_{2-} = 0.116571$$

$$\phi = 0.033333 \quad L = 45$$

Thus, $$0.35\phi = 0.011667$$

$$0.92\phi = 0.030667$$

and the objective lens system satisfies the condition:

$$0.35\phi < \phi_2 < 0.92\phi$$

Further, $$(\phi_1 + \phi_2)/\phi = 1.640123$$

$$1.05L\phi = 1.575000$$

$$1.15L\phi = 1.725000$$

$$1.05L\phi < (\phi_1 + \phi_2)/\phi < 1.15L\phi$$

Further, $$|\phi_{2+}/\phi_{2-}| = 1.122481$$

and the objective lens system satisfies the condition:

$$0.9 < |\phi_{2+}/\phi_{2-}| < 1.2$$

FIGS. 8A, 8B, 8C and 8D illustrate spherical aberration, sine condition, astigmatism and distortion aberration of the objective lens system for a microscope shown in FIG. 7. The results shown in FIGS. 8A to 8D are obtained through computer simulation based on the aforementioned data.

A-3. Effect

As understood from FIGS. 6A, 6B, 8A and 8B, in each of the examples, aberration is small with respect to rays in ultraviolet and far ultraviolet regions. Further, aberration with respect to rays (symbols A, B and D) in a far ultraviolet region having wavelengths shorter than 300 nm is smaller than aberration with respect to a ray (symbol C) in an ultraviolet region having a wavelength longer than 300 nm. Thus, it is obvious that the respective objective lens system shown in FIGS. 4 and 7 are effectively employable in a far ultraviolet region. Further, it is clear that aberration is small also with respect to rays (symbols E and F) in visible and infrared regions. Thus, the objective lens systems are employable within a range of infrared to far ultraviolet regions.

In addition, as apparent from FIGS. 6C, 6D, 8C and 8D, astigmatism and distortion are reduced.

B. Second Embodiment

An objective lens system for a microscope according to a second embodiment of the present invention includes: a first lens group formed by a first lens having a negative power and a first biconvex lens; and a second lens group formed by a biconcave lens made of quartz and a biconvex lens made of fluorite. The first lens formed of a first biconcave lens made of quartz or fluorite, or is formed of a lens in the form of a meniscus lens made of quartz having a concave surface which is directed toward an object. The first lens, first biconvex lens, biconcave lens and biconvex lens are serially arranged from an object side toward an image formation side, through air.

The aforementioned objective lens system satisfies the following conditions:

$$\phi_2 > 0$$

$$\phi_2 > 0$$

$$0.35\phi < \phi_2 < 0.9\phi$$

$$1.05L\phi < (\phi_1 + \phi_2)/\phi < 1.15L\phi$$

$$1.45 < |\phi_{1-}/\phi_{1-}| < 1.65$$

$$0.8 < |\phi_{2-}/\phi_{2-}| < 1.1$$

where $\phi_1$: power of first lens group $\phi_2$: power of the second lens group $\phi$: power of objective lens system L : distance between object plane and image side focal point of lens system $\phi_{1+}$: power of first biconvex lens forming first lens group $\phi_{1-}$: power of first lens forming first lens group $\phi_{2+}$: power of second biconvex lens forming second lens group $\phi_{2-}$: power of second biconcave lens forming second lens group The power $\phi_2$ of the second lens group is less than 90% and in excess of 35% of the power $\phi$ of the objective lens system. This is because the working distance is reduced if the power $\phi_2$ exceeds 90% of the power $\phi$ and because the full length of the objective lens system becomes excessive (compared to the focal length) if the power $\phi_2$ is less than 35% of the power $\phi$.

A value of $(\phi_1 + \phi_2)/\phi$ is less than 115% and in excess of 105% of a value obtained by multiplying the power $\phi$ of the objective lens system by the distance L between the object plane and the image side focus of the objective lens system. This is because the curvature of an image surface is increased excessively due to an increase in Petzval's sum and the length of the objective lens system becomes excessive (compared to the focal length) if the value $(\phi_1 + \phi_2)/\phi$ exceeds 115% of the value $L \cdot \phi$. Yet it is difficult to attain telecentricity if the value $(\phi_1 + \phi_2)/\phi$ is less than 105% of the value $L \cdot \phi$.

An absolute value $|\phi_{1+}/\phi_{1-}|$ is less than 1.65 and in excess of 1.45. This is because correction of chromatic aberration is difficult if the absolute value $|\phi_{1+}/\phi_{1-}|$ is out of this region and correction of spherical aberration is insufficient if the absolute value $|\phi_{1+}/\phi_{1-}|$ exceeds 1.65. Yet correction is excessive and the curvature of the image surface is increased if the absolute value $|\phi_{1+}/\phi_{1-}|$ is less than 1.45.

An absolute value $|\phi_{2+}/\phi_{2-}|$ is less than 1.1 and in excess of 0.8. This is because correction of chromatic aberration is difficult if the absolute value $|\phi_{2+}/\phi_{2-}|$ is out of this region and correction of spherical aberration is insufficient if the absolute value $|\phi_{2+}/\phi_{2-}|$ exceeds 1.1. Yet correction is excessive and the curvature of the image surface is increased if the absolute value $|\phi_{2-}/\phi_{2-}|$ is less than 0.8.

The range of values for $|\phi_{1+}/\phi_{1-}|$ is different than the range of values for $|\phi_{2+}/\phi_{2-}|$. This is because it is necessary to correct the aberration of the first and second lens groups separately since an effective aperture of the first lens group is larger than that of the second lens group and yet it is desirable to correct the aberration simultaneously.

To correct chromatic aberration, the positive lens forming the first lens group would preferably be formed by a convex lens made of fluorite. Yet the effective aperture of the first lens group is small, whereby the influence of the first lens group on chromatic aberration is small. Thus, correction of chromatic aberration is not always required. Accordingly, the positive lens may be formed by a convex lens made of quartz. (It is difficult to work on a convex lens made of fluorite.)

According to the second embodiment of the present invention, the first and second lens groups are made of quartz or fluorite, respectively. No adhesive is present between the first lens and the first biconvex lens, between the first biconvex lens and the second biconcave lens or between the second biconcave lens and the second biconvex lens. Thus, the objective lens system can transmit not only visible and infrared rays but also ultraviolet and/or far ultraviolet rays.

Further, since the first and second lens groups are formed by a negative power lens and a positive power lens, respectively, spherical aberration and chromatic aberration can be corrected.

B-1. Third Example

Figure 9:
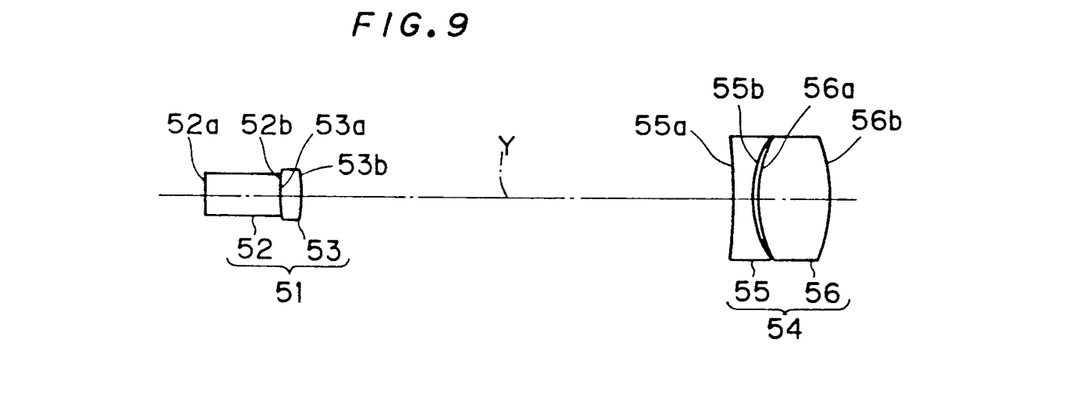
FIG. 9 is an arrangement view showing an example of an objective lens system according to the second embodiment of the present invention.
Figure 10A:
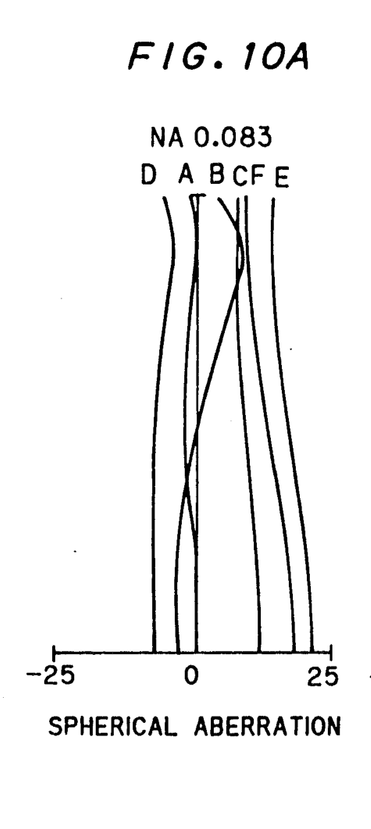
FIGS. 10A, 10B, 10C and 10D illustrate spherical aberration, sine condition, astigmatism and distortion aberration of the objective lens system for a microscope shown in FIG. 9, respectively.
Figure 10B:
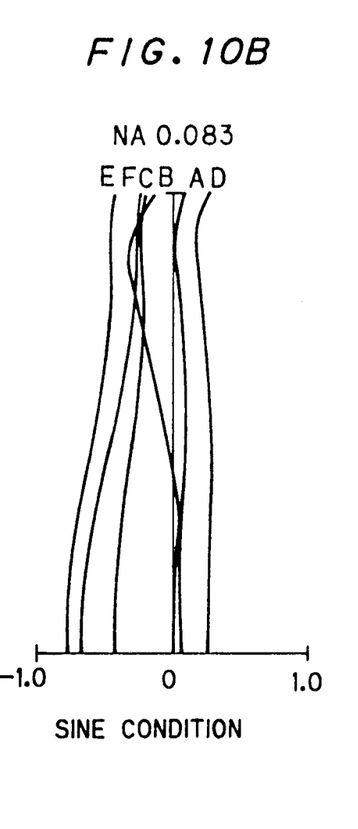
Figure 10C:
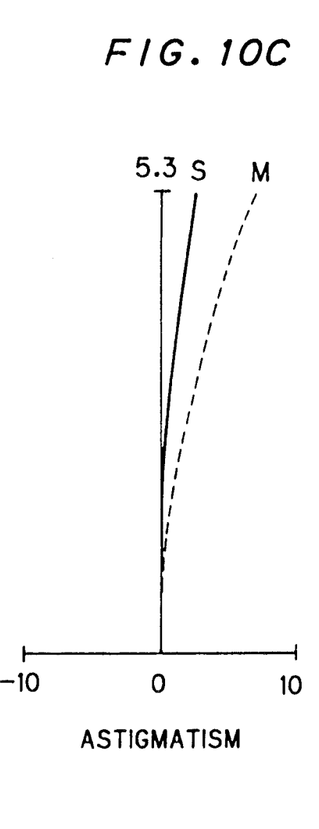
Figure 10D:
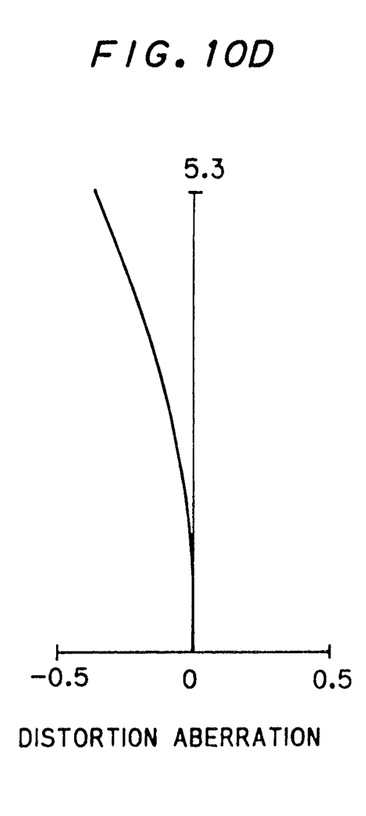

FIG. 9 illustrates an example of an objective lens system according to the second embodiment of the present invention. As shown in FIG. 9, the objective lens system includes a first lens group 51 and a second lens group 54. The first lens group is formed by a meniscus lens 52 made of quartz which has a negative power and a biconvex lens 53 made of quartz. The second lens group 54 is formed by a biconcave lens 55 made of quartz and a biconvex lens 56 made of fluorite. A convex surface 52a of the meniscus lens 52 faces an object side (left-hand side of the figure). The meniscus lens 52, the biconvex lens 53, the biconcave lens 55 and the biconvex lens 56 are successively disposed in order from the object side, through air.

The numerical aperture, image size (diameter) and imaging magnification of the objective lens system of FIG. 9 are 0.083, 10.6 mm and $-10$, respectively.

Referring to miniscus lens 52, a radius of curvature $R_1$ of the convex surface 52a and a radius of curvature $R_2$ of a surface 52b are as follows: ps $R_1 = 17.430 \quad R_2 = 5.200$ Referring to miniscus lens 53, a radius of curvature $R_3$ to a surface 53a (facing the objective side) and a radius of curvature $R_4$ of a surface 53b are as follows:

$R_3 = 22.800 \quad R_4 = -7.260$

Referring to the biconcave lens 55, a radius of curvature $R_5$ of a surface 55a (facing the object side) and a radius of curvature $R_6$ of a surface 55b are as follows:

$R_5 = -17.550 \quad R_6 = 5.300$

Referring to the biconvex lens 56, a radius of curvature $R_7$ of a surface 56a (facing the object side) and the radius of curvature $R_8$ of a surface 56b (facing the image formation side) are as follows:

$R_7 = 5.700 \quad R_8 = -7.600$

Central thickness values $D_1$, $D_2$, $D_3$ and $D_4$ of the lenses 52, 53, 55 and 56, respectively, are as follows:

$D_1 = 3.50 \quad D_2 = 1.00$ $D_3 = 0.90 \quad D_4 = 3.60$

Further, the spacing $D_{12}$ between the meniscus lens 52 and the biconvex lens 53 on an optical axis Y, the spacing $D_{23}$ between the biconvex lens 53 and the biconcave lens 55 on the optical axis Y and the spacing $D_{34}$ between the biconcave lens 55 and the biconvex lens 56 on the optical axis Y are as follows:

$D_{12} = 0.10 \quad D_{23} = 20.50 \quad D_{34} = 0.20$

All of the radii of curvature $R_1$ to $R_8$, the thickness values $D_1$ to $D_4$ and the spacing values $D_{12}$ and $D_{34}$ are in millimeters. This also applies to the following description.

In the objective lens system shown in FIG. 9, the power $\phi_1$ of the first lens group 51, the power $\phi_2$ of the second lens group 54, the power $\phi_{1-}$ of the meniscus lens 52 forming the first lens group 51, the power $\phi_{1+}$ of the biconvex lens 53 forming the first lens group 51, the power $\phi_{2-}$ of the biconcave lens 55 forming the second lens group 54, the power $\phi_{2+}$ of the biconvex lens 56 forming the second lens group 54, the power $\phi$ of the objective lens system and the distance L between the object plane and the image side focal point of the lens system are as follows:

$\phi_1 = 0.025453 \quad \phi_2 = 0.029426$ $\phi_{1-} = -0.059710 \quad \phi_{1+} = 0.087720$ $\phi_{2-} = -0.121523 \quad \phi_{2+} = 0.127712$ $\phi = 0.033333 \quad L = 45$ Thus, $0.35\phi = 0.011667$ $0.9\phi = 0.030000$ and the objective lens system satisfies the conditions:

$0.35\phi < \phi_2 < 0.9\phi$

Further, $(\phi_1 - \phi_2)/\phi = 1.646370$ $1.05L\phi = 1.575000$ $1.35L\phi = 1.725000$ and the objective lens system satisfies the condition:

$1.05L\phi < (\phi_1 - \phi_2)/\phi < 1.15L\phi$

Further, $\phi_{1+}/\phi_{1-} = 1.469101$

The objective lens system satisfies the condition:

$1.45 < \phi_{1+}/\phi_{1-} < 1.65$

Further, $\phi_{2+}/\phi_{2-} = 1.050929$ and the objective lens system satisfies the condition:

$0.8 < \phi_{2+}/\phi_{2-} < 1.1$

FIGS. 10A, 10B, 10C and 10D illustrate spherical aberration, sine condition, astigmatism and distortion aberration of the objective lens system. The results shown in FIGS. 10A to 10D are obtained through computer simulation based on the aforementioned data.

B-2. Fourth Example

Figure 11:
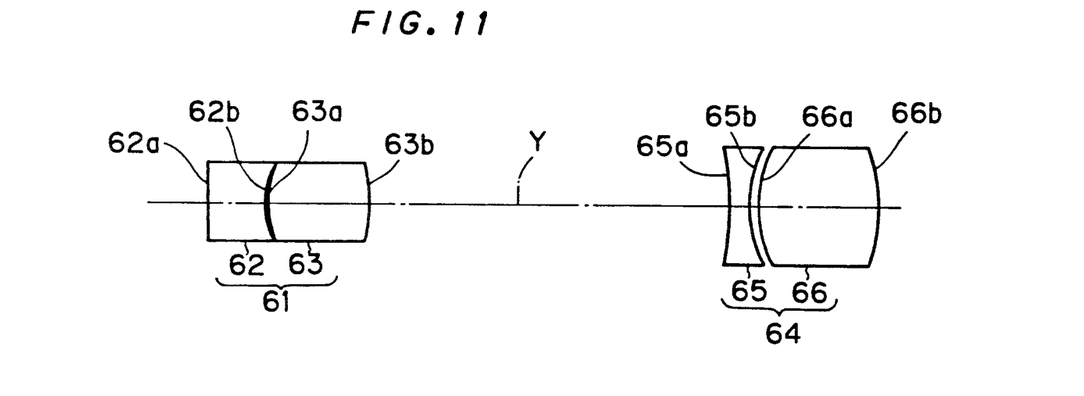
FIG. 11 is an arrangement view showing another example of an objective lens system according to the second embodiment of the present invention.
Figure 12A:
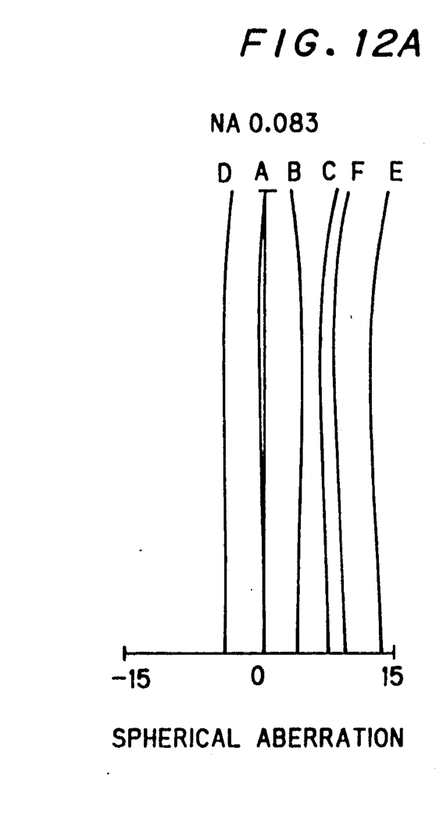
FIGS. 12A, 12B, 12C and 12D illustrate spherical aberration, sine condition, astigmatism and distortion aberration of the objective lens system for a microscope shown in FIG. 11, respectively.
Figure 12B:
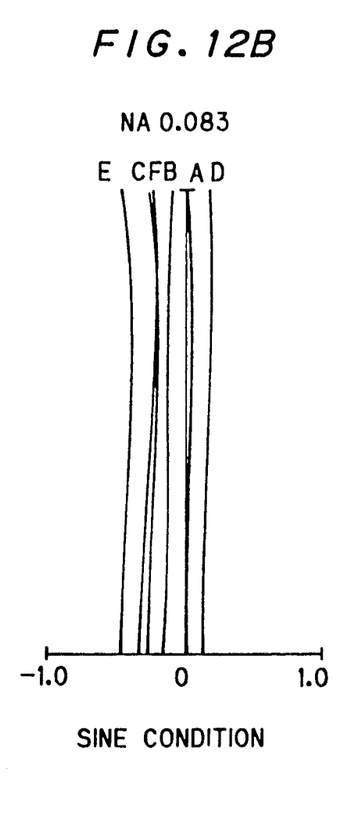
Figure 12C:
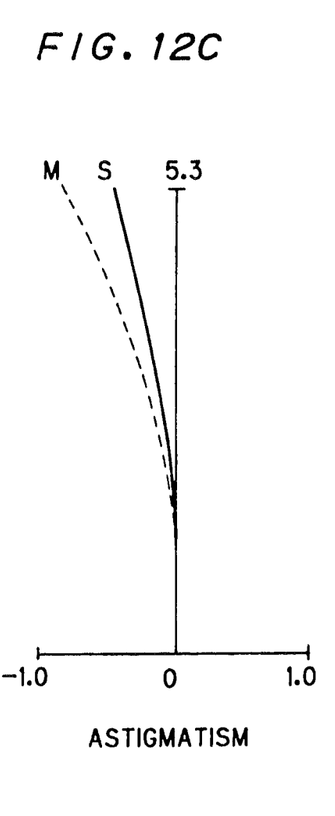
Figure 12D:
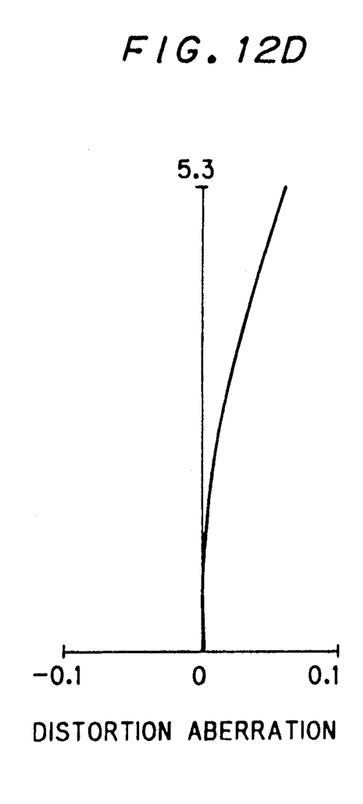

FIG. 11 illustrates another example of an objective lens system according to the second embodiment of the present invention. The objective lens system according to this fourth example is different from the third example in that a biconvex lens 63 forming a first lens group 61 is made of fluorite instead of quartz. The first lens group 61 is otherwise identical to the first lens group of the third example, as shown in FIG. 11. Therefore, redundant description is omitted.

The numerical aperture, image size (diameter) and imaging magnification of the second example are equal to that of the third example.

Referring to the meniscus lens 62 (made of quartz), the radius of curvature $R_1$ of the convex surface 62a and the radius of curvature $R_2$ of the surface 62b (directed toward the image formation side) (right-hand side of the figure) are as follows:

$R_1 = 49.692 \quad R_2 = 6.062$

Referring to the biconvex lens 63 (made of fluorite), the radius of curvature $R_3$ of the surface 63a facing the object side and the radius of curvature $R_4$ of the surface 63b facing the image formation side are as follows:

$R_3 = 6.062 \quad R_4 = -11.980$

Referring to the biconcave lens 65, the radius of curvature $R_5$ of the surface 65a and the radius of curvature $R_6$ of the surface 65b are as follows:

$R_5 = -12.992 \quad R_6 = 6.328$

Referring to the biconvex lens 66, the radius of curvature $R_7$ of the surface 66a (directed toward the object side) and the radius of curvature $R_8$ of the surface 66b (facing the image formation side) are as follows:

$R_7 = 7.288 \quad R_8 = -9.253$

Central thickness values $D_1$, $D_2$, $D_3$ and $D_4$ of the lenses 62, 63, 65 and 66, respectively, are as follows:

$D_1 = 3.00 \quad D_2 = 5.00$ $D_3 = 1.00 \quad D_4 = 6.00$

Further, the spacing $D_{12}$ between the meniscus lens 62 and the biconvex lens 63 on an optical axis Y, the spacing $D_{23}$ between the biconvex lens 63 and the biconcave lens 65 on the optical axis Y and the spacing $D_{34}$ between the biconcave lens 65 and the biconvex lens 66 on the optical axis Y are as follows:

$D_{12} = 0.10 \quad D_{23} = 17.75 \quad D_{34} = 0.45$

The power $\phi_1$ of the first lens group 61, the power $\phi_2$ of the second lens group 64, the power $\phi_{1-}$ of the meniscus lens 62 forming the first lens group 61, the power $\phi_{1+}$ of the biconvex lens 63 forming the first lens group 61, the power $\phi_{2-}$ of the biconcave lens 65 forming the second lens group 64, the power $\phi_{2+}$ of the biconvex lens 66 forming the second lens group 64, the power $\phi$ of the objective lens system and the distance L between the object plane and the image side focal point of the lens system are as follows:

$\phi_1 = 0.041662 \quad \phi_2 = 0.013444$ $\phi_{1-} = -0.069139 \quad \phi_{1+} = 0.103115$ $\phi_{2-} = -0.116715 \quad \phi_{2+} = 0.098827$ $\phi = 0.03333 \quad L = 45$ Thus, $0.35\phi = 0.011667$ $0.9\phi = 0.030000$ and the objective lens satisfies the condition:

$0.35\phi < \phi_2 < 0.9\phi$

Further, $(\phi_1 + \phi_2)/\phi = 1.653180$ $1.05L\phi = 1.575000$ $1.15L\phi = 1.725000$ and the objective lens satisfies the condition:

$1.05L\phi < (\phi_1 + \phi_2)/\phi < 1.15L\phi$

Further, $$|\phi_{1-}/\phi_{1-}| = 1.491416$$

and the objective lens satisfies the condition:

$$1.45 < |\phi_{1-}/\phi_{1-}| < 1.65$$

Further, $$|\phi_{2-}/\phi_{2-}| = 0.846738$$

and the objective lens satisfies the condition:

$$0.8 < |\phi_{2-}/\phi_{2-}| < 1.1$$

FIGS. 12A, 12B, 12C and 12D illustrate spherical aberration, sine condition, astigmatism and distortion aberration of the objective lens system for a microscope having the aforementioned structure. The results shown in FIGS. 12A to 12D are obtained through computer simulation based on the aforementioned data.

B-3. Effect

As understood from FIGS. 10A, 10B, 10C, 10D, 12A, 12B, 12C and 12D, an effect similar to that of the first embodiment can be attained.

C. Other

The first lens group of the second embodiment may be formed by the aforementioned biconvex lens and a biconcave lens made of quartz. In this case, since the biconcave lens forming the first lens group is made of quartz, an effect similar to that of the first and second embodiments can be attained.

D. System for Measuring Film Thickness

Figure 13:
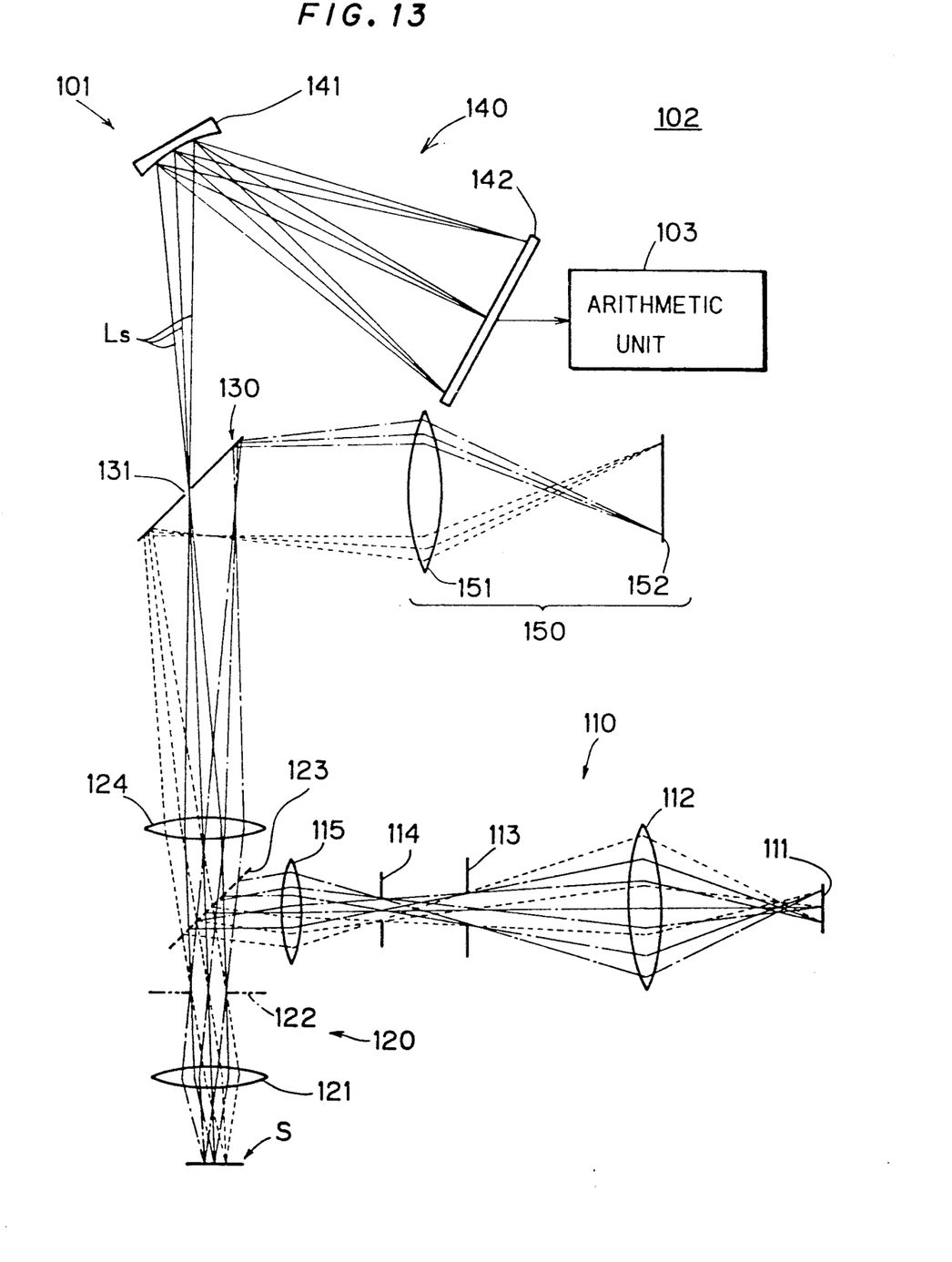
FIG. 13 is a schematic block diagram showing a system for measuring film thickness.

FIG. 13 is a schematic block diagram of a system 102 for measuring film thickness. The system 102 includes a microspectroscope 101 for detecting spectrum of a sample to be measured and an arithmetic unit 103 for calculating the film thickness of the measured sample S on the basis of spectral data obtained by the microspectroscope 101. The microspectroscope 101 includes an illuminating optical system 110, a microscopic optical system 120, a reflecting mirror 130, a spectroscopic unit 140, and a monitoring optical system 150.

The illuminating optical system 110 includes a light source 111 for projecting light which includes ultraviolet and far ultraviolet rays, a condenser lens 112, an aperture stop 113, a field stop 114 and another condenser lens 115. Thus, illuminating light from the light source 111 is guided to the microscopic optical system 120 through the condenser lens 112, the aperture stop 113, the field stop 114 and the condenser lens 115.

The microscopic optical system 120 includes an objective lens 121 which is identical to that shown in FIG. 4, an image-formation lens 124 which is identical to that shown in FIG. 5 and a beam splitter 123 provided between the objective lens 121 and the image-formation lens 124. Symbol 122 denotes a pupil position of the objective lens 121.

The illuminating light from the light source 111 passes through the condenser lens 112, the aperture stop 113, the field stop 114 and the condenser lens 115, and is guided to the objective lens 121 by the beam splitter 123. The illuminating light is transmitted through the objective lens 121 and is applied onto the surface of a measured sample S. The sample S is supported by a sample holder (not shown).

Reflected light from the surface of the sample S is enlarged by the lens 121 and imaged at a position close to the reflecting mirror 130, the beam splitter 123 and the image-formation lens 124.

The reflecting mirror 130 is provided with a pinhole 131. Reflected light $L_S$ passing through the pinhole 131 enters the spectroscopic unit 140.

The spectroscopic unit 140 includes a diffraction grating 141 for separating the reflected light $L_S$ into spectral components and a photo detector 142 for detecting the spectrum of the spectrally diffracted light. The diffraction grating 141 may be prepared by a flat field type diffraction grating which images a spectrum on a flat plane. Alternatively, the diffraction grating may have a sweeper. The photo detector 142, which is formed by a photodiode array or a CCD, for example, is conjugate with the pinhole 131. Alternatively, the photo detector 142 may include a photomultiplier.

Since the spectroscopic unit 140 has the aforementioned structure, the reflected light $L_S$ is separated into its spectral components by the diffraction grating 141, and the respective spectral components are received by the photo detector 142, which in turn outputs a signal corresponding to the spectrum of the light $L_S$.

The light reflected by the reflecting mirror 130 enters the monitoring optical system 150, and is imaged at an image-formation position 152 through a relay lens 151. Thus, an enlarged image of the surface of the sample S is imaged on an image-formation plane, so that the measuring position of the sample S can be confirmed and focusing can be performed on the basis of the enlarged image.

Figure 14:
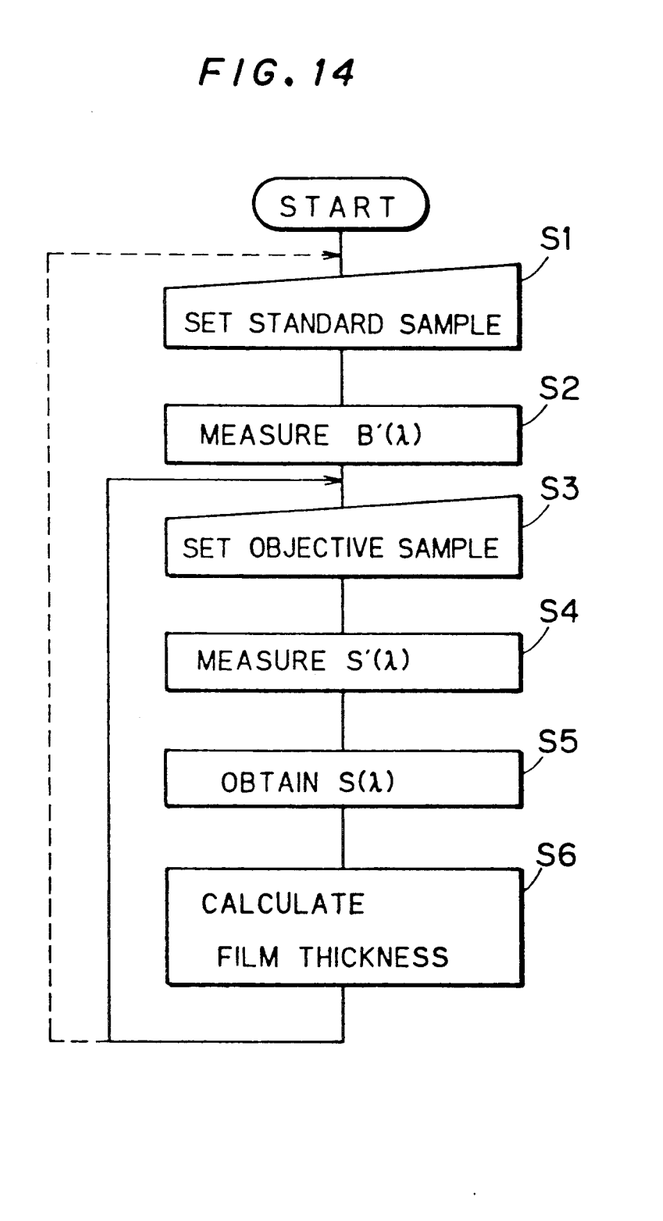
FIG. 14 is a flow chart showing a method of measuring film thickness by the system shown in FIG. 13.

FIG. 14 is a flow chart of a method of measuring film thickness. Prior to using the measuring system 102, an operator inputs spectrum data $B(\lambda)$ of a sample (hereinafter referred to as "standard sample"), whose spectrum data is known, in the arithmetic unit 103 through a keyboard (not shown), to store the data in a memory (not shown) provided in the arithmetic unit 103. The standard sample may be prepared by a silicon substrate, a substrate which is deposited with aluminum on its surface, or the like.

Then, the operator sets the standard sample on the sample holder of the microspectroscope 101 (step S1), and supplies a command for detecting calibration data to the arithmetic unit 103. In response to a command from the arithmetic unit 103, the microspectroscope 101 detects the spectrum of the standard sample, to store data $B'(\lambda)$ relating to the spectrum in the memory of the arithmetic unit 103 (step S2).

Then, the operator removes the standard sample from the microspectroscope 101 and sets the measured sample S on the sample holder (step S3). Thereafter, the operator supplies a command to the arithmetic unit 103 to start measurement, so that the microspectroscope 101 detects the spectrum of the measured sample S in response to a command outputted from the arithmetic unit 103, to store data $S'(\lambda)$ relating to the spectrum thereof in the memory of the arithmetic unit 103 (step S4).

The data $S'(\lambda)$, $B(\lambda)$ and $B'(\lambda)$ stored in the memory are read (step S5) into the arithmetic unit 103, to obtain data $S(\lambda)$ in accordance with the following expression:

$$S(\lambda) = \frac{B(\lambda)}{B'(\lambda)} \cdot S'(\lambda) \qquad (1)$$

The data $S(\lambda)$ corresponds to a signal from the microspectroscope 101 on the assumption that absolutely no influence is caused by the aforementioned factors. In other words, the data $S(\lambda)$ shows the true spectrum of the measured sample S.

On the basis of the data $S(\lambda)$ obtained during step S5, the arithmetic unit 103 calculates the thickness of the thin film (step S6). The principle of calculating film thickness is well known in the art, and hence description thereof is omitted.

As understood from the expression (1), the data $S'(\lambda)$ relating to the actually measured spectrum is calibrated in the aforementioned manner to obtain the data $S(\lambda)$ relating to the true spectrum, whereby the film thickness can be accurately measured.

The present invention can be employed within the measuring system 102. But the present invention is not restricted to use within a system for measuring film thickness. The invention has general applications as an objective lens optical system.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. An objective lens system, comprising:
   a first lens group including a meniscus lens, said meniscus lens having a concave surface which is directed toward an object, said meniscus lens being made of a material which transmits ultraviolet and/or far ultraviolet light from said object, said meniscus lens having a positive power; and
   a second lens group including a biconcave lens and a biconvex lens, said biconcave lens and said biconvex lens being made of a material which transmits said ultraviolet and/or far ultraviolet light, said second lens group being spaced apart from said first lens group, said biconcave lens being located between said meniscus lens and said biconvex lens, said biconvex lens being spaced apart from said biconcave lens.

2. The system of claim 1, wherein said meniscus lens is made of quartz.

3. The system of claim 1, wherein said meniscus lens is made of fluorite.

4. The system of claim 1, wherein said biconcave lens is made of quartz.

5. The system of claim 4, wherein said biconvex lens is made of fluorite.

6. The system of claim 5, wherein said first lens group, said biconcave lens and said biconvex lens are separated from each other by air.

7. The system of claim 6, wherein the following inequalities are satisfied:

$$\phi_1 > 0$$

$$\phi_2 > 0$$

$$0.35\phi < \phi_2 < 0.92\phi$$

$$1.05L\phi < (\phi_1 + \phi_2)/\phi < 1.15L\phi$$

$$0.9 < |\phi_{2+}/\phi_{2+}| 1.2$$

wherein:
   $\phi_1$ = power of said first lens group
   $\phi_2$ = power of said second lens group
   $\phi$ = power of said objective lens system
   L = distance between said object and the focal point of said objective lens system in an image formation direction
   $\phi_{2+}$ = power of said biconvex lens
   $\phi_{2-}$ = power of said biconcave lens.

8. An objective lens system, comprising:
   a first lens group including a first lens and a second lens, said first lens having a negative power, said second lens being a biconvex lens, said first lens being located between an object and said second lens, said first and second lenses being made of a material which transmits ultraviolet and/or far ultraviolet light from said object; and
   a second lens group including a third biconcave lens and a fourth biconvex lens, said third lens being spaced apart from said second lens, said third lens being located between said second lens and said fourth lens, said fourth lens being spaced apart from said third lens, said third and fourth lenses being made of a material which transmits said ultraviolet and/or far ultraviolet light.

9. The system of claim 8, wherein said third lens is made of quartz.

10. The system of claim 9, wherein said fourth lens is made of fluorite.

11. The system of claim 10, wherein said first lens is made of quartz.

12. The system of claim 11, wherein said first lens is a meniscus lens with a convex surface which is directed toward said object.

13. The system of claim 12, wherein said first, second, third and fourth lenses are separated from each other by air.

14. The system of claim 13, wherein the following inequalities are satisfied:

$$\phi_1 > 0$$

$$\phi_2 > 0$$

$$0.35\phi < \phi_2 < 0.9\phi$$

$$1.05L\phi < (\phi_1 + \phi_2)/\phi < 1.15L\phi$$

$$1.45 < |\phi_{1+}/\phi_{1-}| < 1.65$$

$$0.8 < |\phi_{2-}/\phi_{2-}| < 1.1$$

wherein:
   $\phi_1$ = power of said first lens group
   $\phi_2$ = power of said second lens group
   $\phi$ = power of said objective lens system
   L = distance between said object and the focal point of said objective lens system in said image formation direction
   $\phi_{1+}$ = power of said second lens
   $\phi_{1-}$ = said power of said first lens
   $\phi_{2+}$ = power of said fourth lens
   $\phi_{2-}$ = power of said third lens.

15. The system of claim 11, wherein said first lens is a biconcave lens.

16. The system of claim 15, wherein said second lens is made of quartz.

17. The system of claim 15, wherein said second lens is made of fluorite.

18. An objective lens system, comprising:
   a first lens group which is capable of transmitting ultraviolet and/or far ultraviolet light from an object; and a second lens group which is spaced apart from said first lens group, said second lens group including a first lens and a second lens, said first lens being located between said first lens group and said second lens, said second lens being spaced apart from said first lens, said first and second lenses being capable of transmitting said ultraviolet and/or far ultraviolet light; and wherein the following inequalities are satisfied:

$$\phi_1 > 0$$

$$\phi_2 > 0$$

$$0.35\phi < \phi_2 < 0.9\phi$$

$$1.05L\phi < (\phi_1 + \phi_2)/\phi < 1.15L\phi$$

$$0.8 < |\phi_{2+}/\phi_{2-}| < 1.2$$

wherein:
$\phi_1$ = power of said first lens group
$\phi_2$ = power of said second lens group
$\phi$ = power of said objective lens system
L = distance between said object and the focal point of said objective lens system in said image formation direction
$\phi_{2+}$ = power of said second lens
$\phi_{2-}$ = power of said first lens.

19. An apparatus for measuring the thickness of a film on a sample, said apparatus comprising:
means for illuminating a sample; and
a microscopic optical system for imaging ultraviolet and/or far ultraviolet light from said sample, said microscopic optical system including an objective lens system for converging said light in an image formation direction, said objective lens system including:

(A) a first lens group which is capable of transmitting said ultraviolet and/or far ultraviolet light; and
(B) a second lens group which is spaced apart from said first lens group, said second lens group including a first lens and a second lens, said first lens being located between said first lens group and said second lens, said second lens being spaced apart from said first lens, said first and second lenses being capable of transmitting said ultraviolet and/or far ultraviolet light; and wherein the following inequalities are satisfied:

$$\phi_1 > 0$$

$$\phi_2 > 0$$

$$0.35\phi < \phi_2 < 0.9\phi$$

$$1.05L\phi < (\phi_1 + \phi_2)/\phi < 1.15L\phi$$

$$0.8 < |\phi_{2+}/\phi_{2-}| < 1.2$$

wherein:
$\phi_1$ = power of said first lens group
$\phi_2$ = power of said second lens group
$\phi$ = power of said objective lens system
L = distance between said object and the focal point of said objective lens system in said image formation direction
$\phi_{2+}$ = power of said second lens
$\phi_{2-}$ = power of said first lens.

20. The apparatus of claim 19, further comprising:
spectroscopic means for separating said light into spectral components;
a detector for detecting said spectral components; and
means for calculating the thickness of said sample as a function of said spectral components.

* * * * *